US011562229B2

(12) United States Patent
Lin et al.

(10) Patent No.: US 11,562,229 B2
(45) Date of Patent: Jan. 24, 2023

(54) CONVOLUTION ACCELERATOR USING IN-MEMORY COMPUTATION

(71) Applicant: MACRONIX INTERNATIONAL CO., LTD., Hsinchu (TW)

(72) Inventors: Yu-Yu Lin, Taipei (TW); Feng-Min Lee, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 884 days.

(21) Appl. No.: 16/450,334

(22) Filed: Jun. 24, 2019

(65) Prior Publication Data

US 2020/0175363 A1 Jun. 4, 2020

Related U.S. Application Data

(60) Provisional application No. 62/773,194, filed on Nov. 30, 2018.

(51) Int. Cl.
*G06N 3/08* (2006.01)
*G06N 20/10* (2019.01)
(Continued)

(52) U.S. Cl.
CPC .............. *G06N 3/08* (2013.01); *G06F 17/15* (2013.01); *G06F 17/16* (2013.01); *G06N 20/10* (2019.01)

(58) Field of Classification Search
CPC ........ G06F 17/15; G06F 17/153; G06F 17/16; G06N 20/10; G06N 3/0454; G06N 3/063; G06N 3/08
See application file for complete search history.

(56) References Cited

U.S. PATENT DOCUMENTS

| 4,219,829 A | 8/1980 | Dorda et al. |
| 4,987,090 A | 1/1991 | Hsu et al. |

(Continued)

FOREIGN PATENT DOCUMENTS

| CN | 101432821 A | 5/2009 |
| CN | 1998012 B | 11/2010 |

(Continued)

OTHER PUBLICATIONS

Yu-Hsin Chen,"Eyeriss: An Energy-Efficient Reconfigurable Accelerator for Deep Convolutional Neural Networks," Nov. 8, 2016, IEEE Journal of Solid-State Circuits, vol. 52 , No. 1, Jan. 2017,pp. 127-134.*

(Continued)

*Primary Examiner* — Omar S Ismail
(74) *Attorney, Agent, or Firm* — Andrew L. Dunlap; Haynes Beffel & Wolfeld LLP

(57) ABSTRACT

A method for accelerating a convolution of a kernel matrix over an input matrix for computation of an output matrix using in-memory computation involves storing in different sets of cells, in an array of cells, respective combinations of elements of the kernel matrix or of multiple kernel matrices. To perform the convolution, a sequence of input vectors from an input matrix is applied to the array. Each of the input vectors is applied to the different sets of cells in parallel for computation during the same time interval. The outputs from each of the different sets of cells generated in response to each input vector are sensed to produce a set of data representing the contributions of that input vector to multiple elements of an output matrix. The sets of data generated across the input matrix are used to produce the output matrix.

17 Claims, 8 Drawing Sheets

(51) Int. Cl.
    *G06F 17/15*     (2006.01)
    *G06F 17/16*     (2006.01)

(56) References Cited

U.S. PATENT DOCUMENTS

| | | |
|---|---|---|
| 5,029,130 A | 7/1991 | Yeh |
| 5,586,073 A | 12/1996 | Hiura et al. |
| 6,107,882 A | 8/2000 | Gabara et al. |
| 6,313,486 B1 | 11/2001 | Kencke et al. |
| 6,829,598 B2 | 12/2004 | Milev |
| 6,906,940 B1 | 6/2005 | Lue |
| 6,960,499 B2 | 11/2005 | Nandakumar et al. |
| 7,089,218 B1 | 8/2006 | Visel |
| 7,368,358 B2 | 5/2008 | Ouyang et al. |
| 7,436,723 B2 | 10/2008 | Rinerson et al. |
| 7,747,668 B2 | 6/2010 | Nomura et al. |
| 8,203,187 B2 | 6/2012 | Lung et al. |
| 8,275,728 B2 | 9/2012 | Pino |
| 8,432,719 B2 | 4/2013 | Lue |
| 8,589,320 B2 | 11/2013 | Breitwisch et al. |
| 8,630,114 B2 | 1/2014 | Lue |
| 8,725,670 B2 | 5/2014 | Visel |
| 8,860,124 B2 | 10/2014 | Lue et al. |
| 9,064,903 B2 | 6/2015 | Mitchell et al. |
| 9,147,468 B1 | 9/2015 | Lue |
| 9,213,936 B2 | 12/2015 | Visel |
| 9,379,129 B1 | 6/2016 | Lue et al. |
| 9,391,084 B2 | 7/2016 | Lue |
| 9,430,735 B1 | 8/2016 | Vali et al. |
| 9,431,099 B2 | 8/2016 | Lee et al. |
| 9,524,980 B2 | 12/2016 | Lue |
| 9,535,831 B2 | 1/2017 | Jayasena et al. |
| 9,536,969 B2 | 1/2017 | Yang et al. |
| 9,589,982 B1 | 3/2017 | Cheng et al. |
| 9,698,156 B2 | 7/2017 | Lue |
| 9,698,185 B2 | 7/2017 | Chen et al. |
| 9,710,747 B2 | 7/2017 | Kang et al. |
| 9,747,230 B2 | 8/2017 | Han et al. |
| 9,754,953 B2 | 9/2017 | Tang et al. |
| 9,767,028 B2 | 9/2017 | Cheng et al. |
| 9,898,207 B2 | 2/2018 | Kim et al. |
| 9,910,605 B2 | 3/2018 | Jayasena et al. |
| 9,978,454 B2 | 5/2018 | Jung |
| 9,983,829 B2 | 5/2018 | Ravimohan et al. |
| 9,991,007 B2 | 6/2018 | Lee et al. |
| 10,037,167 B2 | 7/2018 | Kwon et al. |
| 10,056,149 B2 | 8/2018 | Yamada et al. |
| 10,073,733 B1 | 9/2018 | Jain et al. |
| 10,157,012 B2 | 12/2018 | Kelner et al. |
| 10,175,667 B2 | 1/2019 | Bang et al. |
| 10,242,737 B1 | 3/2019 | Lin et al. |
| 10,528,643 B1 | 1/2020 | Choi et al. |
| 10,534,840 B1 | 1/2020 | Petti |
| 10,565,494 B2 | 1/2020 | Henry et al. |
| 10,635,398 B2 | 4/2020 | Lin et al. |
| 10,643,713 B1 | 5/2020 | Louie et al. |
| 10,719,296 B2 | 7/2020 | Lee et al. |
| 10,777,566 B2 | 9/2020 | Lue |
| 10,783,963 B1 | 9/2020 | Hung et al. |
| 10,825,510 B2 | 11/2020 | Jaiswal et al. |
| 10,860,682 B2 | 12/2020 | Knag et al. |
| 10,942,673 B2 | 3/2021 | Shafiee Ardestani et al. |
| 10,957,392 B2 | 3/2021 | Lee et al. |
| 11,410,028 B2 | 8/2022 | Crill et al. |
| 2003/0122181 A1 | 7/2003 | Wu |
| 2005/0287793 A1 | 12/2005 | Blanchet et al. |
| 2010/0182828 A1 | 7/2010 | Shima et al. |
| 2010/0202208 A1 | 8/2010 | Endo et al. |
| 2011/0063915 A1 | 3/2011 | Tanaka et al. |
| 2011/0106742 A1 | 5/2011 | Pino |
| 2011/0128791 A1 | 6/2011 | Chang et al. |
| 2011/0194357 A1 | 8/2011 | Han et al. |
| 2011/0286258 A1 | 11/2011 | Chen et al. |
| 2011/0297912 A1 | 12/2011 | Samachisa et al. |
| 2012/0007167 A1 | 1/2012 | Hung et al. |
| 2012/0044742 A1 | 2/2012 | Narayanan |
| 2012/0182801 A1 | 7/2012 | Lue |
| 2012/0235111 A1 | 9/2012 | Osano et al. |
| 2012/0254087 A1 | 10/2012 | Visel |
| 2013/0070528 A1 | 3/2013 | Maeda |
| 2013/0075684 A1 | 3/2013 | Kinoshita et al. |
| 2014/0043898 A1 | 2/2014 | Kuo et al. |
| 2014/0063949 A1 | 3/2014 | Tokiwa |
| 2014/0119127 A1 | 5/2014 | Lung et al. |
| 2014/0149773 A1 | 5/2014 | Huang et al. |
| 2014/0268996 A1 | 9/2014 | Park |
| 2014/0330762 A1 | 11/2014 | Visel |
| 2015/0008500 A1 | 1/2015 | Fukumoto et al. |
| 2015/0171106 A1 | 6/2015 | Suh |
| 2015/0199126 A1 | 7/2015 | Jayasena et al. |
| 2015/0331817 A1 | 11/2015 | Han et al. |
| 2016/0141337 A1 | 5/2016 | Shimabukuro et al. |
| 2016/0181315 A1 | 6/2016 | Lee et al. |
| 2016/0232973 A1 | 8/2016 | Jung |
| 2016/0247579 A1 | 8/2016 | Ueda et al. |
| 2016/0308114 A1 | 10/2016 | Kim et al. |
| 2016/0336064 A1 | 11/2016 | Seo et al. |
| 2016/0342892 A1* | 11/2016 | Ross ..................... G06N 3/063 |
| 2016/0342893 A1* | 11/2016 | Ross ..................... G06N 5/04 |
| 2016/0358661 A1 | 12/2016 | Vali et al. |
| 2017/0003889 A1* | 1/2017 | Kim ..................... G06F 3/067 |
| 2017/0025421 A1 | 1/2017 | Sakakibara et al. |
| 2017/0092370 A1 | 3/2017 | Harari |
| 2017/0103316 A1* | 4/2017 | Ross ..................... G06N 5/04 |
| 2017/0123987 A1 | 5/2017 | Cheng et al. |
| 2017/0148517 A1 | 5/2017 | Harari |
| 2017/0160955 A1 | 6/2017 | Jayasena et al. |
| 2017/0169885 A1 | 6/2017 | Fang et al. |
| 2017/0169887 A1 | 6/2017 | Widjaja |
| 2017/0263623 A1 | 9/2017 | Zhang et al. |
| 2017/0270405 A1 | 9/2017 | Kurokawa |
| 2017/0309634 A1 | 10/2017 | Noguchi et al. |
| 2017/0316833 A1 | 11/2017 | Ihm et al. |
| 2017/0317096 A1 | 11/2017 | Shin et al. |
| 2017/0337466 A1* | 11/2017 | Bayat ..................... G06F 3/061 |
| 2018/0113649 A1 | 4/2018 | Shafiee Ardestani et al. |
| 2018/0121790 A1 | 5/2018 | Kim et al. |
| 2018/0129424 A1 | 5/2018 | Confalonier et al. |
| 2018/0129936 A1* | 5/2018 | Young ..................... G06N 3/04 |
| 2018/0144240 A1 | 5/2018 | Garbin et al. |
| 2018/0157488 A1 | 6/2018 | Shu et al. |
| 2018/0173420 A1 | 6/2018 | Li et al. |
| 2018/0189640 A1 | 7/2018 | Henry et al. |
| 2018/0240522 A1 | 8/2018 | Jung |
| 2018/0246783 A1 | 8/2018 | Avraham et al. |
| 2018/0247195 A1* | 8/2018 | Kumar ..................... G06N 3/08 |
| 2018/0286874 A1 | 10/2018 | Kim et al. |
| 2018/0321942 A1 | 11/2018 | Yu et al. |
| 2018/0342299 A1 | 11/2018 | Yamada et al. |
| 2018/0350823 A1 | 12/2018 | Or-Bach et al. |
| 2019/0019538 A1 | 1/2019 | Li et al. |
| 2019/0019564 A1 | 1/2019 | Li et al. |
| 2019/0035449 A1 | 1/2019 | Saida et al. |
| 2019/0043560 A1* | 2/2019 | Sumbul ..................... G11C 7/1006 |
| 2019/0065151 A1 | 2/2019 | Chen et al. |
| 2019/0088329 A1* | 3/2019 | Tiwari ..................... G06N 3/061 |
| 2019/0102170 A1 | 4/2019 | Chen et al. |
| 2019/0138892 A1* | 5/2019 | Kim ..................... G06N 3/049 |
| 2019/0148393 A1 | 5/2019 | Lue |
| 2019/0164044 A1 | 5/2019 | Song et al. |
| 2019/0164617 A1* | 5/2019 | Tran ..................... G11C 11/5628 |
| 2019/0213234 A1 | 7/2019 | Bayat et al. |
| 2019/0220249 A1 | 7/2019 | Lee et al. |
| 2019/0244662 A1 | 8/2019 | Lee et al. |
| 2019/0286419 A1 | 9/2019 | Lin et al. |
| 2019/0311243 A1* | 10/2019 | Whatmough ..................... G06N 3/063 |
| 2019/0311749 A1 | 10/2019 | Song et al. |
| 2019/0325959 A1 | 10/2019 | Bhargava et al. |
| 2019/0340497 A1* | 11/2019 | Baraniuk ..................... G06V 10/764 |
| 2019/0363131 A1 | 11/2019 | Torng et al. |
| 2020/0026993 A1 | 1/2020 | Otsuka |
| 2020/0065650 A1 | 2/2020 | Tran et al. |
| 2020/0110990 A1 | 4/2020 | Harada et al. |
| 2020/0117986 A1* | 4/2020 | Burr ..................... G06F 17/18 |

(56) References Cited

U.S. PATENT DOCUMENTS

| | | | |
|---|---|---|---|
| 2020/0118638 A1* | 4/2020 | Leobandung | G06N 3/0454 |
| 2020/0160165 A1 | 5/2020 | Sarin | |
| 2020/0334015 A1 | 10/2020 | Shibata et al. | |
| 2021/0240945 A1* | 8/2021 | Strachan | G11C 11/401 |

FOREIGN PATENT DOCUMENTS

| | | | |
|---|---|---|---|
| CN | 103778468 A | 5/2014 | |
| CN | 105718994 A | 6/2016 | |
| CN | 105789139 A | 7/2016 | |
| CN | 106530210 A | 3/2017 | |
| CN | 107077879 A | 8/2017 | |
| CN | 107533459 A | 1/2018 | |
| CN | 107767905 A | 3/2018 | |
| CN | 108268946 A | 7/2018 | |
| EP | 2048709 A2 | 4/2009 | |
| JP | H0451382 A | 2/1992 | |
| JP | 2006127623 A | 5/2006 | |
| JP | 2009080892 A | 4/2009 | |
| TW | 201108230 A | 3/2011 | |
| TW | 201523838 A | 6/2015 | |
| TW | 201618284 A | 5/2016 | |
| TW | 201639206 A | 11/2016 | |
| TW | 201715525 A | 5/2017 | |
| TW | 201732824 A | 9/2017 | |
| TW | 201741943 A | 12/2017 | |
| TW | 201802800 A | 1/2018 | |
| TW | 201822203 A | 6/2018 | |
| WO | 2012009179 A1 | 1/2012 | |
| WO | 2012015450 A1 | 2/2012 | |
| WO | 2016060617 A1 | 4/2016 | |
| WO | 2017091338 A1 | 6/2017 | |
| WO | 2018201060 A1 | 11/2018 | |

OTHER PUBLICATIONS

Sujan K. Gonugondla,"Energy-Efficient Deep In-memory Architecture for NAND Flash Memories," May 4, 2018,2018 IEEE International Symposium on Circuits and Systems (ISCAS),pp. 1-4.*

Rui Liu,"Parallelizing SRAM Arrays with Customized Bit-Cell for Binary Neural Networks," Sep. 20, 2018,2018 55th ACM/ESDA/IEEE Design Automation Conference (DAC),pp. 1-4.*

Panni Wang,"Three-Dimensional NAND Flash for Vector-Matrix Multiplication," Dec. 9, 2018,IEEE Transactions on Very Large Scale Integration (VLSI) Systems, vol. 27, No. 4, Apr. 201,pp. 988-990.*

Chen et al., "Eyeriss: An Energy-Efficient reconfigurable accelerator for deep convolutional neural networks," IEEE ISSCC, Jan. 31-Feb. 4, 2016, 3 pages.

Jang et al., "Vertical cell array using TCAT(Terabit Cell Array Transistor) technology for ultra high density NAND flash memory," 2009 Symposium on VLSI Technology, Honolulu, HI, Jun. 16-18, 2009, pp. 192-193.

Jung et al., "Three Dimensionally Stacked NAND Flash Memory Technology Using Stacking Single Crystal Si Layers on ILD and TANOS Structure for Beyond 30nm Node," International Electron Devices Meeting, 2006. IEDM '06, Dec. 11-13, 2006, pp. 1-4.

Kim et al. "Multi-Layered Vertical Gate NAND Flash Overcoming Stacking Limit for Terabit Density Storage," 2009 Symposium on VLSI Technology Digest of Papers, Jun. 16-18, 2009, 2 pages.

Kim et al. "Novel Vertical-Stacked-Array-Transistor (VSAT) for Ultra-High-Density and Cost-Effective NAND Flash Memory Devices and SSD (Solid State Drive)", Jun. 2009 Symposium on VLSI Technolgy Digest of Technical Papers, pp. 186-187. (cited in parent-copy not provided herewith).

Lai et al., "A Multi-Layer Stackable Thin-Film Transistor (TFT) NAND-Type Flash Memory," Electron Devices Meeting, 2006, IEDM '06 International, Dec. 11-13, 2006, pp. 1-4.

Lue et al., "A Novel 3D AND-type NVM Architecture Capable of High-density, Low-power In-Memory Sum-of-Product Computation for Artificial Intelligence Application," IEEE VLSI, Jun. 18-22, 2018, 2 pages.

Ohzone et al., "Ion-Implanted Thin Polycrystalline-Silicon High-Value Resistors for High-Density Poly-Load Static RAM Applications," IEEE Trans on Electron Devices, vol. ED-32, No. 9, Sep. 1985, 8 pages.

Sakai et al., "A Buried Giga-Ohm Resistor (BGR) Load Static RAM Cell," IEEE Symp. on VLSI Technology, Digest of Papers, Sep. 10-12, 1984, 2 pages.

Schuller et al.,"Neuromorphic Computing: From Materials to Systems Architecture," U.S. Dept. of Energy, Oct. 29-30, 2015, Gaithersburg, MD, 40 pages.

Seo et al., "A Novel 3-D Vertical FG NAND Flash Memory Cell Arrays Using the Separated Sidewall Control Gate (S-SCG) for Highly Reliable MLC Operation," 2011 3rd IEEE International Memory Workshop (IMW), May 22-25, 2011, 4 pages.

Soudry, et al. "Hebbian learning rules with memristors," Center for Communication and Information Technologies CCIT Report #840, Sep. 1, 2013, 16 pages.

Tanaka H., et al., "Bit Cost Scalable Technology with Punch and Plug Process for Ultra High Density Flash Memory," 2007 Symp. VLSI Tech., Digest of Tech. Papers, pp. 14-15.

U.S. Appl. No. 16/224,602, filed Dec. 18, 2018, 35 pages.

Whang, SungJin et al. "Novel 3-dimensional Dual Control-gate with Surrounding Floating-gate (DC-SF) NAND flash cell for 1Tb file storage application," 2010 IEEE Int'l Electron Devices Meeting (IEDM), Dec. 6-8, 2010, 4 pages.

EP Extended Search Report from EP19193290.4 dated Feb. 14, 2020, 10 pages.

Gonugondla et al., "Energy-Efficient Deep In-memory Architecture for NAND Flash Memories," IEEE International Symposium on Circuits and Systems (ISCAS), May 27-30, 2018, 5 pages.

TW Office Action from TW Application No. 10820980430, dated Oct. 16, 2019, 6 pages (with English Translation).

US Office Action in U.S. Appl. No. 15/873,369 dated Dec. 4, 2019, 5 pages.

U.S. Office Action in related case U.S. Appl. No. 16/037,281 dated Dec. 19, 2019, 9 pages.

U.S. Office Action in related case U.S. Appl. No. 16/297,504 dated Feb. 4, 2020, 15 pages.

Wang et al., "Three-Dimensional NAND Flash for Vector-Matrix Multiplication," IEEE Trans, on Very Large Scale Integration Systems (VLSI), vol. 27, No. 4, Apr. 2019, 4 pages.

U.S. Office Action in U.S. Appl. No. 16/233,414 dated Apr. 20, 2020, 17 pages.

JP Office Action in Application No. JP 2019-166959 dated Nov. 16, 2021 with English Machine Translation, 9 pages.

Chen et al., "A Highly Pitch Scalable 3D Vertical Gate (VG) NAND Flash Decoded by a Novel Self-Aligned Independently Controlled Double Gate (IDG) StringSelect Transistor (SSL)," 2012 Symp. on VLSI Technology (VLSIT), Jun. 12-14, 2012, pp. 91-92.

Choi et al., "Performance Breakthrough in NOR Flash Memory With Dopant-Segregated Schottky-Barrier (DSSB) SONOS Devices," Jun. 2009 Symposium on VLSITechnology Digest of Technical Papers, pp. 222-223.

Fukuzumi et al. "Optimal Integration and Characteristics of Vertical Array Devices for Ultra-High Density, Bit-Cost Scalable Flash Memory," IEEE Dec. 2007, pp. 449-452.

Hsu et al., "Study of Sub-30nm Thin Film Transistor (TFT) Charge-Trapping (CT) Devices for 3D NAND Flash Application," 2009 IEEE, Dec. 7-9, 2009, pp. 27.4.1-27.4.4.

Hubert et al., "A Stacked SONOS Technology, Up to 4 Levels and 6nm Crystalline Nanowires, With Gate-All-Around or Independent Gates (Flash), Suitable for Full 3D Integration," IEEE 2009, Dec. 7-9, 2009, pp. 27.6.1-27.6 4.

Hung et al., "A highly scalable vertical gate (VG) 3D NAND Flash with robust program disturb immunity using a novel PN diode decoding structure," 2011 Symp. on VLSI Technology (VLSIT), Jun. 14-16, 2011, pp. 68-69.

Katsumata et al., "Pipe-shaped BiCS Flash Memory With 16 Stacked Layers and Multi-Level-Cell Operation for Ultra High Density Storage Devices," 2009 Symposium on VLSI Technology Digest of Technical Papers, Jun. 16-18, 2009, pp. 136-137.

(56) References Cited

OTHER PUBLICATIONS

Kim et al., "Novel 3-D Structure for Ultra High Density Flash Memory with VRAT (Vertical-Recess-Array-Transistor) and PIPE (Planarized Integration on the same PlanE)," IEEE 2008 Symposium on VLSI Technology Digest of Technical Papers, Jun. 17-19, 2008, pp. 122-123.

Kim et al., "Three-Dimensional NAND Flash Architecture Design Based on Single-Crystalline STacked ARray," IEEE Transactions on Electron Devices, vol. 59, No. 1, pp. 35-45, Jan. 2012.

Lue et al., "A Highly Scalable 8-Layer 3D Vertical-Gate (VG) TFT NAND Flash Using Junction-Free Buried Channel BE-SONOS Device", 2010 Symposium on VLSI Technology Digest of Technical Papers, pp. 131-132, Jun. 15-17, 2010.

Nowak et al., "Intrinsic fluctuations in Vertical NAND flash memories," 2012 Symposium on VLSI Technology, Digest of Technical Papers, pp. 21-22, Jun. 12-14, 2012.

TW Office Action from TW Application No. 10820907820, dated Sep. 22, 2020, 41 pages.

Wang, Michael, "Technology Trends on 3D-NAND Flash Storage", Impact 2011, Taipei, dated Oct. 20, 2011, found at www.impact.org.tw/2011/Files/NewsFile/201111110190.pdf.

Y.X. Liu et al., "Comparative Study of Tri-Gate and Double-Gate-Type Poly-Si Fin-Channel Spli-Gate Flash Memories," 2012 IEEE Silicon Nanoelectronics Workshop (SNW), Honolulu, HI, Jun. 10-11, 2012, pp. 1-2.

Aritome, et al., "Reliability issues of flash memory cells," Proc. of the IEEE, vol. 81, No. 5, May 1993, pp. 776-788.

Guo et al., "Fast, energy-efficient, robust, and reproducible mixed-signal neuromorphic classifier based on embedded NOR flash memory technology," IEEE Int'l Electron Devices Mtg., San Francisco, CA, Dec. 2-6, 2017, 4 pages.

Merrikh-Bayat et al., "High-Performance Mixed-Signal Neurocomputing with Nanoscale Flowting-Gate Memory Cell Arrays," IEEE Transactions on Neural Netowrks and Learning Systems, vol. 29, No. 10, Oct. 2018, pp. 4782-4790.

U.S. Office Action in U.S. Appl. No. 16/279,494 dated Nov. 12, 2020, 25 pages.

U.S. Office Action in U.S. Appl. No. 16/359,919 dated Oct. 16, 2020, 13 pages.

U.S. Office Action in U.S. Appl. No. 16/224,602 dated Nov. 23, 2020, 14 pages.

Webopedia, "SoC", Oct. 5, 2011, pp. 1-2, https://web.archive.org/web/20111005173630/https://www.webopedia.com/TERM/S/SoC.html (Year: 2011)—See Office Action dated Aug. 17, 2020 in U.S. Appl. No. 16/279,494 for relevance—no month provided.

Anonymous, "Data in the Computer", May 11, 2015, pp. 1-8, https://web.archive.org/web/20150511143158/https://homepage.cs.uri.edu/faculty/wolfe/book/Readings/Reading02.htm (Year 2015)—See Office Action dated Aug. 17, 2020 in U.S. Appl. No. 16/279,494 for relevance—no year provided.

Rod Nussbaumer, "How is data transmitted through wires in the computer?", Aug. 27, 2015, pp. 1-3, https://www.quora.com/How-is-data-transmitted-through-wires-in-the-computer (Year: 2015)—See Office Action dated Aug. 17, 2020 in U.S. Appl. No. 16/279,494 for relevance—no year provided.

Scott Thornton, "What is DRAm (Dynamic Random Access Memory) vs SRAM?", Jun. 22, 2017, pp. 1-11, https://www.microcontrollertips.com/dram-vs-sram/ (Year: 2017)—See Office Action dated Aug. 17, 2020 in U.S. Appl. No. 16/279,494 for relevance—no year provided.

TW Office Action from TW Application No. 10920683760, dated Jul. 20, 2020, 4 pages.

U.S. Office Action in U.S. Appl. No. 16/233,404 dated Jul. 30, 2020, 20 pages.

U.S. Office Action in U.S. Appl. No. 16/279,494 dated Aug. 17, 2020, 25 pages.

Webopedia, "DRAM—dynamic random access memory", Jan. 21, 2017, pp. 1-3, https://web.archive.org/web/20170121124008/https://www.webopedia.com/TERM/D/DRAM.html (Year: 2017)—See Office Action dated Aug. 17, 2020 in U.S. Appl. No. 16/279,494 for relevance—no year provided.

Webopedia, "volatile memory", Oct. 9, 2017, pp. 1-4, https://web.archive.org/web/20171009201852/https://www.webopedia.com/TERMN/volatile_memory.html (Year: 2017)—See Office Action dated Aug. 17, 2020 in U.S. Appl. No. 16/279,494 for relevance—no year provided.

U.S. Office Action in U.S. Appl. No. 16/169,345 dated Aug. 16, 2022, 5 pages.

U.S. Office Action in U.S. Appl. No. 16/224,602 dated Mar. 24, 2021, 17 pages.

U.S. Office Action in U.S. Appl. No. 16/359,919 dated Mar. 3, 2021, 15 pages.

U.S. Office Action in U.S. Appl. No. 16/508,189 dated Aug. 8, 2022, 23 pages.

* cited by examiner

CONVOLUTION ACCELERATOR USING IN-MEMORY COMPUTATION

PRIORITY APPLICATION

This application claims the benefit of U.S. Provisional Patent Application No. 62/773,194 filed 30 Nov. 2018, which application is incorporated herein by reference.

BACKGROUND

Field

The present disclosure relates to in-memory computing devices, and more particularly, to in-memory computing devices arranged for executing convolutions.

Description of Related Art

One type of neural network is referred to as a convolutional neural network CNN. In CNNs, one or more layers of the network use a convolution of a kernel matrix over the input matrix to generate an output matrix. An input matrix can comprise an image file or feature map having a height H, a width W, and a depth C. This input matrix can be characterized as a plurality of C-bit vectors having coordinates in the H-W plane. A kernel can include elements of a filter having different dimensions (height R, width S, depth C) than the input matrix. An output matrix can represent the filtered image or output feature map. The output matrix can have different dimensions (height E, width F, depth M) than the input matrix as well. In some systems, a single input matrix is convolved with different kernels (e.g. M filters) to produce a deep output matrix.

A convolution is an intensive operation, requiring significant computer resources and data movement. See, Chen et al. "Eyeriss: An Energy-Efficient Reconfigurable Accelerator for Deep Convolutional Neural Networks," IEEE IS SCC, 31 Jan. 4 Feb. 2016.

It is desirable to provide technology that can reduce the cost and computational resources needed to compute convolutions, including convolutions in CNNs.

SUMMARY

A technology is described in which in-memory computing is deployed to support execution of a convolution, including a convolution as part of a CNN, significantly reducing the amount of data movement and computer resources required.

In-memory computing is an approach in which memory cells, organized in an in-memory computing device, can be used for both computation and storage. The weights for sum-of-products functions, for example, can be stored in memory cells of the in-memory computing device. The electrical characteristics of the memory cells of the array effectuate the sum-of-products function. See for example, co-pending U.S. patent application Ser. No. 16/224,602, filed on 18 Dec. 2018, (MXIC 2266-1), which is incorporated by reference as if fully set forth herein.

Technology described herein comprises a method supporting convolution of a kernel matrix over an input matrix for computation of an output matrix using in-memory computation and a device which can be used for that purpose. In typical convolutions, input vectors from the input matrix are combined with different combinations of elements (e.g. different kernel vectors) of the kernel matrix for computation of elements of the output matrix. In some embodiments, a given input matrix can be convolved with multiple kernel matrices.

A method described herein comprises storing in different sets of cells, in an in-memory computation array of cells, respective combinations of elements of the kernel matrix or of multiple kernel matrices. For a given input vector, a method includes storing combinations of elements of the kernel matrix of the plurality of combinations, in respective sets of cells in an array of cells, such as in respective columns of the array. Then, elements of an input vector from the input matrix are applied to the sets of cells storing the combinations of elements of the kernel matrix, such as by applying the elements of the input vector to the rows of the array. The method includes sensing outputs responsive to the elements of the input vector from the sets of cells, such as each of the columns, to produce data representing contributions of the input vector to multiple elements of the output matrix.

The method can be expanded to traverse all or part of the input matrix, by applying input vectors from the input matrix in a sequence, including said first mentioned input vector, to the sets of cells storing the combinations of elements of the kernel matrix, and for each input vector in the sequence sensing outputs from the sets of cells to produce output data representing contributions to the output matrix. The output data for each of the input vectors can be combined produce the output matrix.

Thus, in embodiments described herein, to perform a convolution, a sequence of input vectors from an input matrix is applied to an in-memory computation array. Each of the input vectors is applied to the different sets of cells (e.g multiple columns in the array) in parallel (e.g. on respective rows of the array) for computation during the same time interval. The outputs generated in response to each input vector are sensed to produce a set of data representing the contributions of that input vector to multiple elements of an output matrix. The sets of data generated for the sequence of input vectors across the input matrix can be combined to produce the output matrix.

An embodiment of a device is described herein that comprises an array of memory cells configured for in-memory computation. A plurality of sets of memory cells in the array, such as a plurality of columns, store respective combinations of elements of a kernel matrix or of multiple kernel matrices. The respective combinations can correspond to the different sets of elements of the kernel matrix applied to the input vector in a plurality of strides of a convolution.

In some embodiments, a first set of access lines is included. Each first access line is operatively coupled to a corresponding memory cell in each of the different sets of memory cells (such as along a row), so that an input voltage can be applied to a cell in different sets (such as different columns) of memory cells in parallel. A second set of access lines is included. Each second access line is operatively coupled to a corresponding set of memory cells (such as in a single column) in the different sets of memory cells.

Driver circuitry is electrically coupled to the set of first access lines, and configured to assert signals representing elements of input vectors on corresponding first access lines. This enables application of an input vector in parallel to each of the a plurality of different sets of memory cells.

Sensing circuitry is electrically coupled to the set of second access lines. On each of the second access lines in the set, the sensing circuitry senses a combination of outputs of the corresponding set of memory cells to produce a set of data representing contributions to elements of the output matrix for each input vector.

In an embodiment described, the array of memory cells comprises a plurality of columns of cells, such as cells arranged along a bit line. Each of the sets of cells in the different sets of cells can be composed of cells in a single column. The sensing circuitry can be arranged to sense a current that represents a combined conductance of cells in the set of cells. Logic circuitry can be included that combines the sets of data generated across an input matrix to produce the output matrix.

A device is described for convolution of a kernel matrix over an input matrix in which input vectors from the input matrix are combined with a plurality of combinations of elements of the kernel matrix for computation of an output matrix. The device comprises an array of memory cells including a plurality of rows and a plurality of columns, storing the combinations of elements of the plurality of combinations of elements of the kernel matrix, in respective columns in the plurality of columns; driver circuitry configured to apply elements of an input vector from the input matrix to respective rows in the plurality of rows; and sensing circuitry to sense output data from the respective columns to produce output data representing contributions of said input vector to elements of the output matrix. Logic can be coupled to the driver circuitry and the sensing circuitry to apply a sequence of input vectors of the input matrix, including said input vector, to the driver circuitry and produce output data representing contributions of input vectors in the sequence, including said input vector, to elements of the output matrix. Logic can be coupled to the sensing circuitry to combine the output data for the sequence of input vectors to produce to produce elements of the output matrix.

In various embodiments, the memory cells utilized can comprise two-terminal cells, including programmable resistance memory cells. In some embodiments, the memory cells utilized can comprise three-terminal cells such as charge trapping memory cells.

In a system described herein, the array of cells is disposed on a first integrated circuit, which can be manufactured using processes suited to formation of the array of cells. Logic can be disposed on circuitry outside the first integrated circuit, such as on a second integrated circuit, which can be manufactured using processes suited for logic circuitry, to provide the sequence of input vectors for a given input matrix to the driver circuitry for the array of cells. Also, logic outside the first integrated circuit, such as on the second integrated circuit, or on yet another integrated circuit, receives the sets of data produced by the sensing circuitry, and combines them for each of the input vectors in the sequence to produce the output matrix.

The technology for accelerating a convolution as described herein can be implemented in support of a convolutional neural network. For example, the convolution of a kernel matrix over an input matrix can comprise a layer of a convolutional neural network.

Other aspects and advantages of the present invention can be seen on review of the drawings, the detailed description and the claims, which follow.

DETAILED DESCRIPTION

A detailed description of embodiments of the present invention is provided with reference to the FIGS. 1-8.

Figure 1:
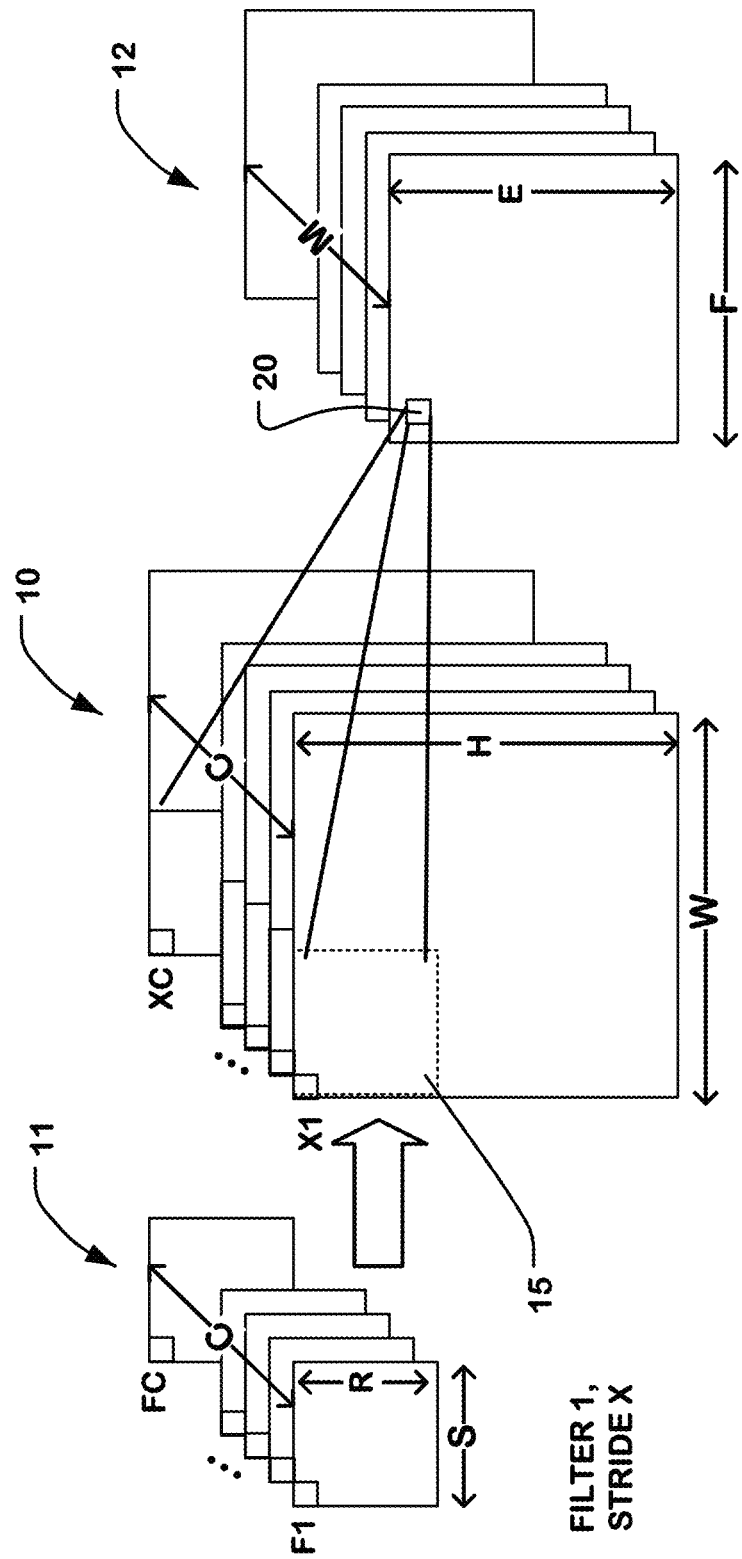
FIG. 1 is an illustration of a particular stage in a convolution operation, and can be referred to for the purposes of terminology used herein.
Figure 2:
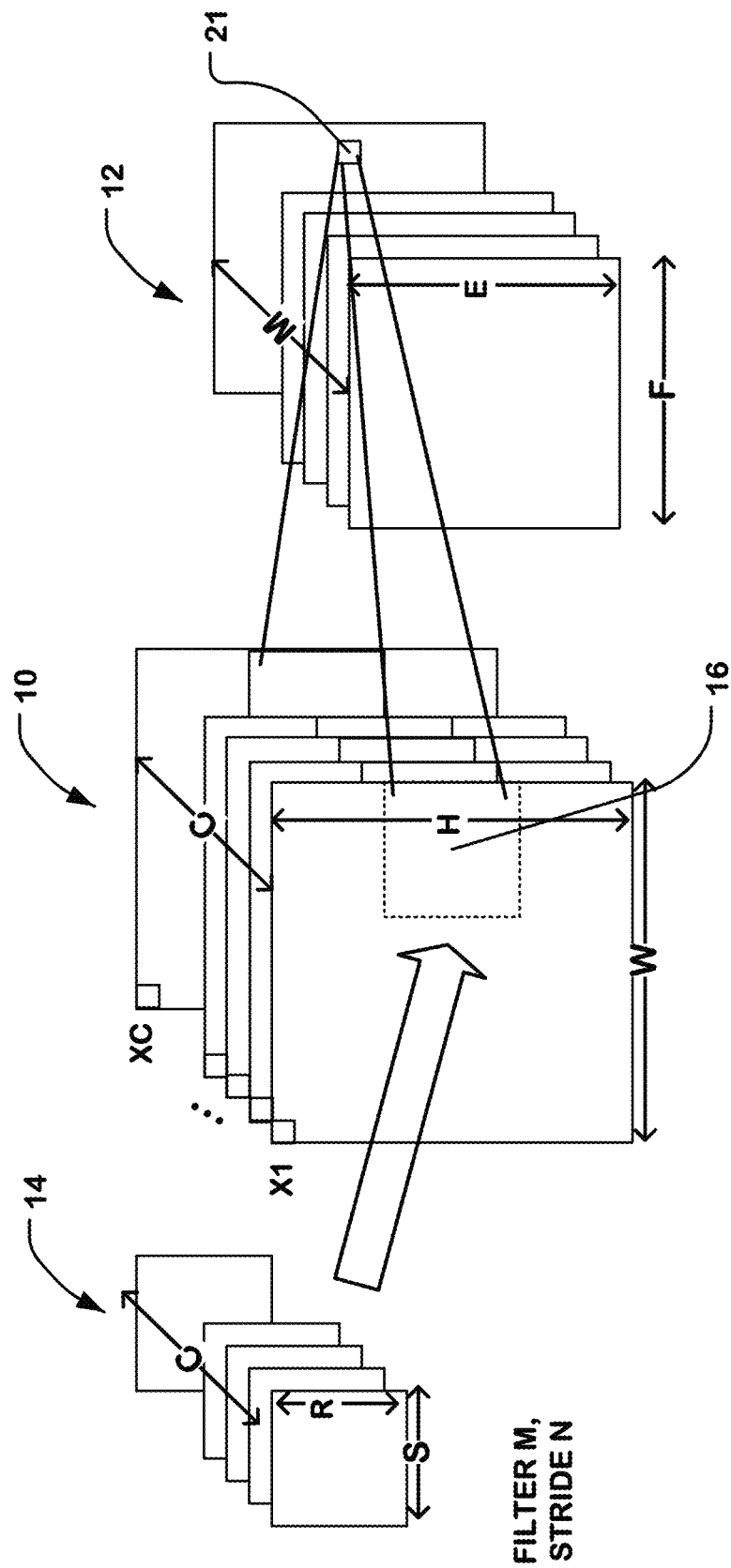
FIG. 2 is an illustration of a different stage in the convolution operation of FIG. 1.

FIGS. 1 and 2 illustrate stages of a convolution operation. In FIG. 1, an input matrix 10 has a height H, a width W and a depth C. In the case of a two-dimensional input matrix, the depth C can be 1. A kernel matrix 11 in this example comprises a three-dimensional filter FILTER 1. The kernel matrix 11 has a height R, a width S and a depth C. The convolution is executed to compute an output matrix 12. In this example, the output matrix 12 has a height E, a width F and a depth M. In a stage, as illustrated in FIG. 1, an element-wise multiplication of input vectors in the input matrix 10 is computed for a given stride STRIDE X and a given kernel matrix FILTER 1. In a stage, as illustrated in FIG. 2, an element-wise multiplication of input vectors in the input matrix is computed for a given stride STRIDE N and a given kernel matrix FILTER M.

In a convolution, the kernel is applied, usually in a scan pattern, to the input matrix in a sequence having a horizontal stride and a vertical stride. In each particular stride, the elements of the kernel are combined with a set of elements of the input matrix in a window at the location of the stride. The results of the computation for each stride can be used to compute a single output value (e.g. 20) in the output matrix 12, or can be used in many other ways depending on the convolution functions. In the illustrated example of FIG. 1, for STRIDE X, the kernel is applied to a set of elements of the input matrix in window 15. The input vector X1:XC at the upper left corner of the input matrix includes elements from each of the layers of the input matrix. This input vector X1:XC for the purpose of STRIDE X is combined with the filter vector F1:FC from the upper left corner of the kernel matrix 11. Each of the input vectors within the window 15 is combined with a corresponding filter vector including a combination of elements of the kernel 11. Results from each of the input vectors within window 15 are combined according to the function of the convolution to produce the output value 20 in the output matrix 12.

For each stride of the input kernel, a different combination of input vectors is utilized as the window for the kernel scans through the input matrix, to produce the corresponding value in the output matrix. However, each of the input vectors can be utilized in multiple strides for computation of multiple output values. For example, if the kernel matrix is a 3×3×C matrix, it can be represented by 9 kernel vectors having a length of C elements each. For a horizontal stride of 1, and a vertical stride of 1, each of the input vectors can be utilized by each of the 9 kernel vectors in 9 different strides.

In FIG. 2, a representation of a stage of the convolution in which kernel FILTER M is applied in stride STRIDE N to compute an output value 21 in the output matrix 12. In this example, FILTER M is applied to compute the elements in layer M of the output matrix. In stride STRIDE N the kernel 14 is applied in the window 16 of the input matrix, and the results combined to computed output value 21 for the output matrix. Thus, this illustrates that multiple kernels, in this example M kernels, can be convolved with an input matrix 10 to compute an output matrix having multiple levels, in this example M levels in which each of the M kernels is used to compute the output values for a corresponding one level of the M levels of the output matrix 12.

Thus, in a convolution, each input vector is combined with the kernel in multiple strides of the convolution, where each stride can be used to compute one element (typically) of the output matrix. In each stride of the convolution in which a given input vector is used, there is a set of elements of the kernel with which it is combined. For each stride, the set of elements of the kernel applied to the input vector is in a different location in the kernel.

In a convolution accelerator as described herein, the multiple sets of elements in the kernel with which a particular input vector is combined, i.e. the sets for every stride in which it is used, are stored in different sets of cells (e.g. cells in different columns) of the array of cells. The outputs of the different sets of cells represent the contribution of the input vector to the output of a respective one of the multiple strides in which it is used in the convolution. The outputs of the different sets of cells can be sensed in parallel, and provided to logic circuitry which gathers and combines them to form the output matrix.

Figure 3:
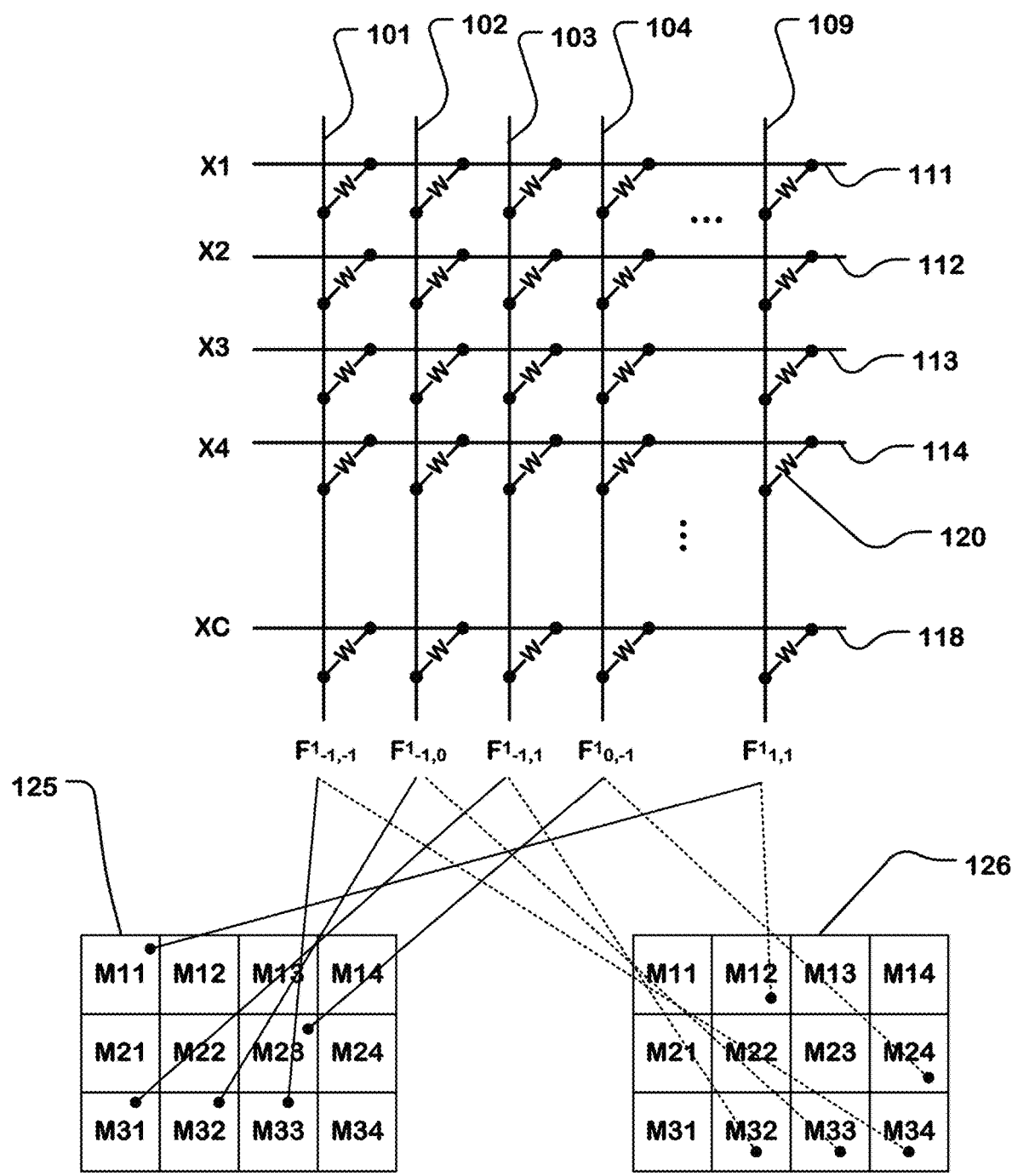
FIG. 3 is a simplified illustration of an array of memory cells configured for acceleration of a convolution operation as described herein.

FIG. 3 illustrates an array of memory cells "W" (e.g. 120). A set of first access lines 111, 112, 113, 114, . . . 118 (such as word lines) is disposed with the array, where each first access line is operatively coupled to memory cells in a row of the array, so that it is coupled to a corresponding memory cell in each of the multiple columns of the array in a single row. A set of second access lines 101, 102, 103, 104, . . . 109 (such as bit lines) is disposed with the array. Each second access line is operatively coupled to a corresponding set of memory cells in a single column in each of the multiple rows of the array.

In this arrangement, the cells in each column that are coupled to the set of first access lines include a set of memory cells which stores a combination of elements of the kernel matrix. For this example, the kernel matrix can be characterized as a set of vectors of length C (e.g. F1-FC of FIG. 1) of filter $F^1$, having coordinates in the R, S plane, as follows:

| | | |
|---|---|---|
| $F^1_{-1,-1}$ | $F^1_{-1,0}$ | $F^1_{-1,1}$ |
| $F^1_{0,-1}$ | $F^1_{0,0}$ | $F^1_{0,1}$ |
| $F^1_{1,-1}$ | $F^1_{1,0}$ | $F^1_{1,1}$ |

Thus, the kernel matrix includes nine vectors. In a convolution of horizontal and vertical stride 1 over an input matrix, each vector of the input matrix can be combined with each of the 9 vectors for the purposes of computing different values in the output matrix. Some input vectors on the edges, for example, may be combined with different numbers of the vectors, depending on the particular convolution being computed.

The array of cells in FIG. 3 stores the elements of one vector of the kernel in one column. Thus, for the 3×3 kernel in this example, 9 sets of cells are used to store 9 vectors. The cells in the column operatively coupled to second access line 101 form a set of cells that stores elements of a vector $F^1_{-1,-1}$, of a first filter $F^1$ at coordinate −1,−1. The cells in the column operatively coupled to second access line 102 form a set of cells that stores elements of a vector $F^1_{-1,0}$ of the first filter $F^1$ at coordinate −1,0. The cells in the column operatively coupled to second access line 103 form a set of cells that stores elements of a vector $F^1_{-1,1}$ of the first filter $F^1$ at coordinate −1,1. The cells in the column operatively coupled to second access line 104 form a set of cells that stores elements of a vector $F^1_{0,-1}$ of the first filter $F^1$ at coordinate 0,−1. The fifth through eighth columns are not shown in FIG. 3. The last column in the array including cells operatively coupled to second access line 109 form a set of cells that stores elements of a vector $F^1_{1,1}$ of the first filter $F^1$ at coordinate 1,1.

To perform an in-memory computation, driver circuitry applies an input vector X1:XC to the set of first access lines 111-118 in this example, assuming a depth C of 8. Sensing circuitry is coupled to the set of second access lines 101-109 to sense, for each of the multiple sets of cells on the different second access lines, a combination of the conductances of the memory cells in their corresponding set of cells.

For example, a current on each of the second access lines represents an element-wise sum-of-products of the filter vector implemented by the weights stored in the memory cells in the column, and an input vector applied on the first access lines. This element-wise sum-of-products can be computed simultaneously utilizing 9 different sense circuits in parallel for each of the 9 filter vectors.

For the purposes of example, FIG. 3 illustrates a portion of an output matrix 125 including 3 rows and 4 columns of elements M11 to M34. In one example, output element M22 can be equal to the sum of the combination of the 9 filter vectors times a window of 9 input vectors, where the input vector at coordinate 2,2 in the input matrix is the center of the window.

Thus, for a window centered at coordinate 2,2 on the input matrix, the output on second access line 101 is a partial sum used for the computation of output element M33. The output on second access line 102 is a partial sum used for the computation of output element M32. The output on second access line 103 is a partial sum used for the computation of output element M31. The output on second access line 104 is a partial sum used for the computation of output element M23, and so on. The output on the second access line 109 is a partial sum used for the computation of output element M11. Thus, the outputs of the nine second access lines represent contributions of the input vector to the computations of nine different strides.

For a next window centered at coordinate 2,3, as illustrated at 126, the output on second access line 101 is a partial sum used for the computation of output element M34. The output on second access line 102 is a partial sum used for the computation of output element M33. The output on second access line 103 is a partial sum used for the computation of output element M32. The output on second access line 104 is a partial sum used for the computation of output element M24, and so on. The output on the second access line 109 is a partial sum used for the computation of output element M12.

To compute the value of an element of the output matrix, the partial sums from each of the input vectors that contribute to that value must be gathered and accumulated as the sequence of input vectors is applied to the array of cells used for the in-memory computation. This function of gathering and accumulating the partial sums can be executed using digital logic and scratchpad memory.

Figure 4:
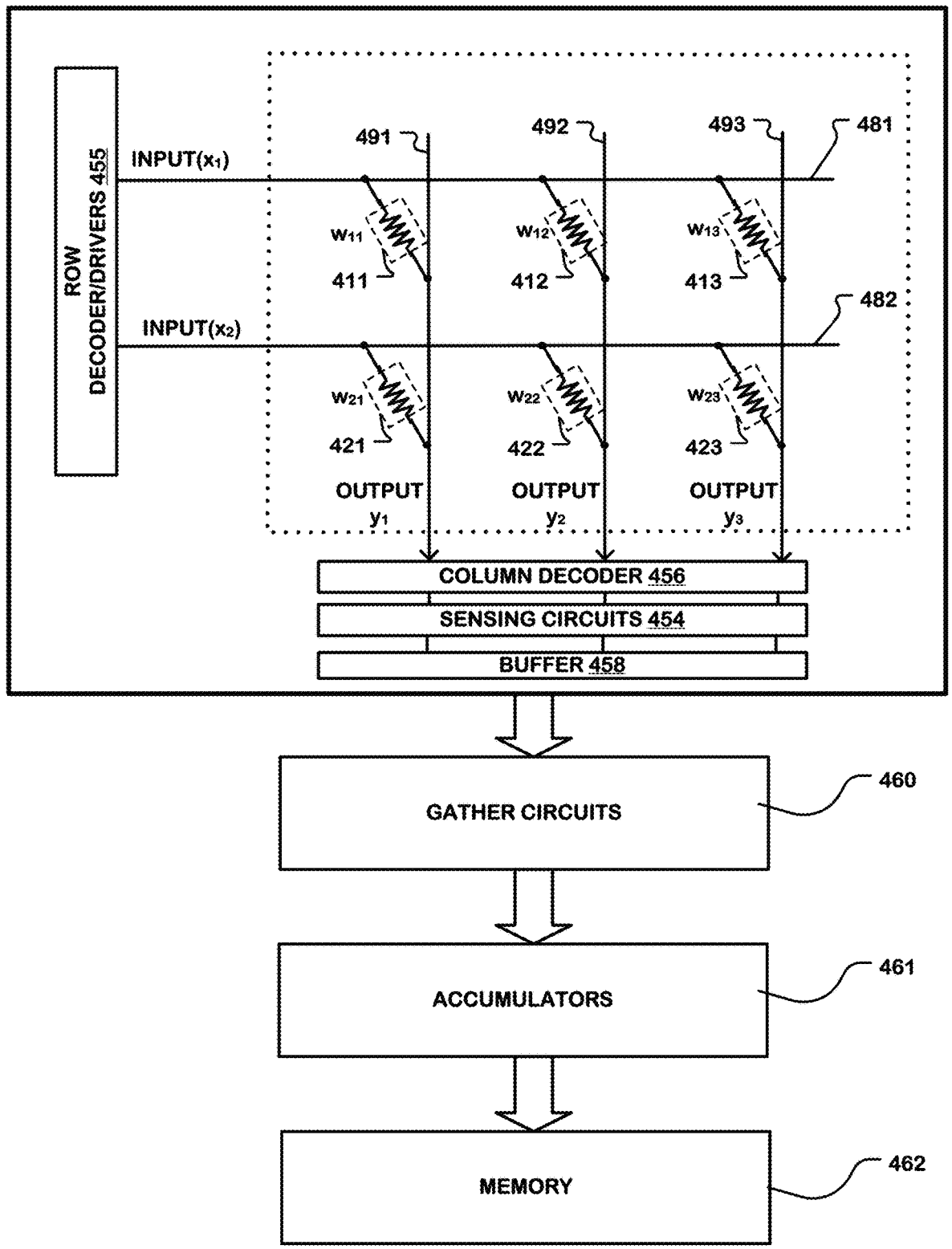
FIG. 4 is a block diagram of a system for accelerating a convolution as described herein.

FIG. 4 illustrates a simplified example of an array of memory cells including a number C of rows (corresponding to the number of row lines) and a number N of columns (corresponding to the number of kernel vectors). In this illustration, the array includes cells 411 and 421 in a first column, cells 412 and 422 in a second column, and cells 413 and 423 in a third column. Of course, embodiments of the array can include many rows and many columns.

The memory cells can be resistive RAMs, where resistances of the memory cells represent the elements of a kernel (e.g. weights in a filter) as discussed above. Each memory cell in the array stores a weight factor $W_{nm}$ corresponding to an element of a filter vector, and can be represented as storing weights $W_{11}$, $W_{12}$, $W_{13}$, $W_{21}$, $W_{22}$, and $W_{23}$ respectively.

A set of first access lines (e.g., 481, 482) is coupled to the memory cells in respective rows of memory cells of the first type. A set of second access lines (e.g., 491, 492, and 493) is coupled to the memory cells in respective columns of the memory cells of the first type. The set of first access lines (e.g., 481, 482) is coupled to the row decoder/drivers 455 and the set of second access lines is coupled to the column decoder 456. Signals on the first access lines in the set of first access lines can represent inputs x1, x2 to the respective rows. In this example, the row decoder/drivers 455 asserts a signal input x1 on the first access line 481 and a signal input x2 on the first access line 482, which can represent elements of an input vector.

The sensing circuit 454 is coupled to respective second access lines in the set of second access lines via the column decoder 456. Current (e.g., y1, y2, y3) sensed at a particular second access line (e.g., 491, 492, 493) in the set of second access lines can represent a sum-of-products of the inputs x1, x2 by respective weight factors Wnm.

Thus, in this example, the set of cells on second access line 491 produces a combined current on the second access line in response to the input vector which, upon sensing, results in a digital value $y_1 = x_1 * w_{11} + x_2 * w_{21}$. The digital value output from line 492 is $y_2 = x_1 * w_{12} + x_2 * w_{22}$. The digital value output from line 493 is $y_3 = x_1 * w_{13} + x_2 * w_{23}$. The sum-of-products outputs $y_1$, $y_2$, $y_3$ can be stored in the data buffer 458, in an output data path.

The output data path is coupled to gather circuits 460, which can comprise a set of multiplexers controllable to align the outputs for a given input vector in multiple groups for combination with the output from other input vectors in the computation of multiple output values. The multiple groups can be applied to a set of accumulator 461 to compute the output matrix values. The output matrix values can then be applied to memory 462.

Figure 5:
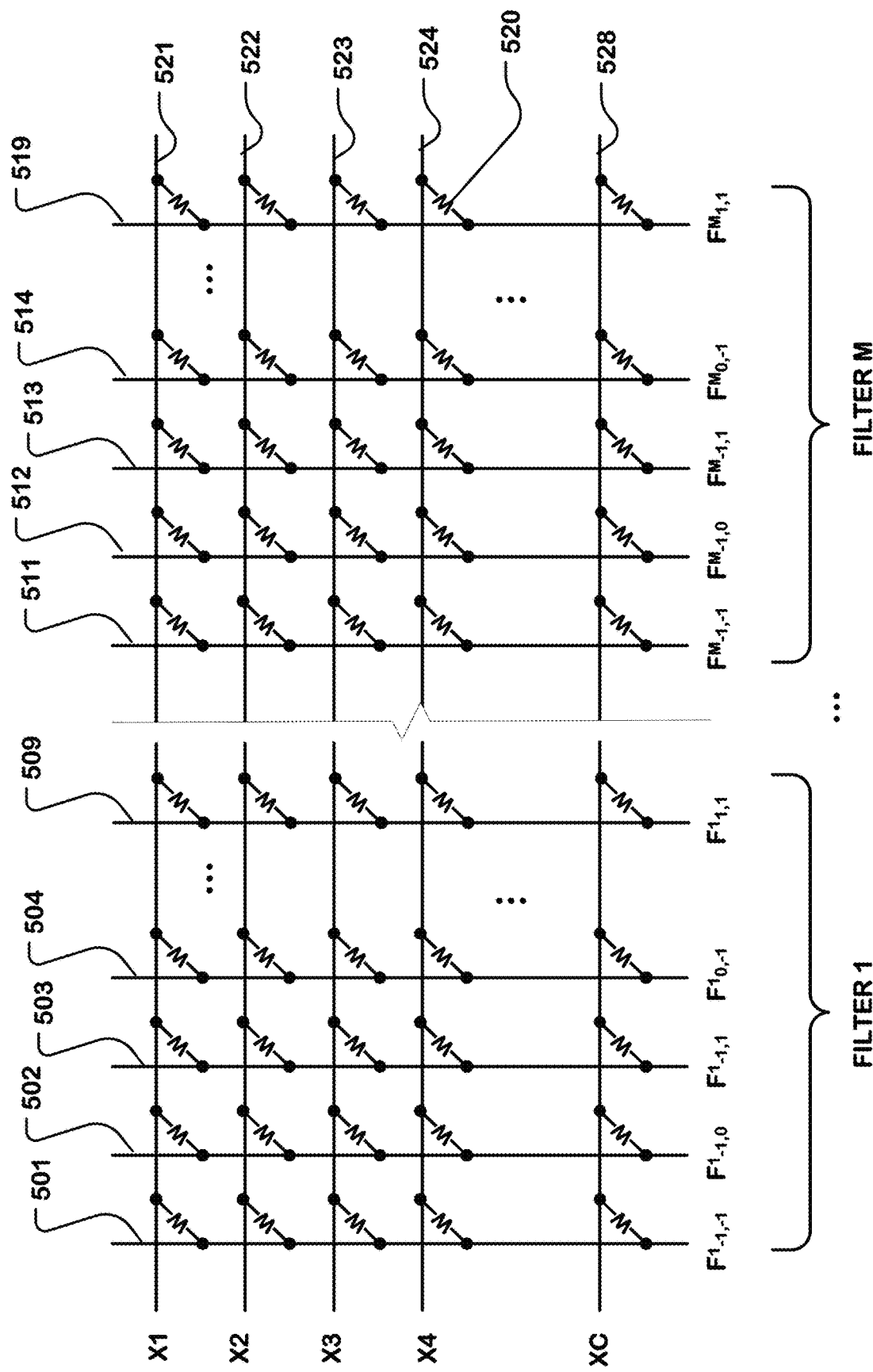
FIG. 5 illustrates an array of memory cells in which different sets of memory cells in the array store respective combinations of elements of multiple kernel matrices.

FIG. 5 shows an array of memory cells, like that of FIG. 3, expanded for the purposes of in-memory computation for multiple kernels (M kernels as illustrated in FIG. 1) in one array of memory cells, which can be configured to apply an input vector to the multiple kernels simultaneously. In this example, an array of memory cells "W" (e.g. 520) is illustrated. A set of first access lines 521, 522, 523, 524, . . . 528 (such as word lines) is disposed with the array, where each first access line is operatively coupled to memory cells in a row of the array so that it is coupled to a corresponding memory cell in each of the multiple columns of the array. A set of second access lines 501, 502, 503, 504, . . . 509 for a first kernel (FILTER 1) and a set of second access lines 511, 512, 513, 514, . . . 519 for an Mth kernel (FILTER M) are disposed with the array. Many second access lines for kernels FILTER 2 to FILTER M−1 are included, in the array but not shown in the figure. Each second access line is operatively coupled to a corresponding set of memory cells in a single column in each of the multiple rows of the array in this example.

In this arrangement, the cells in each column that are coupled to the set of first access lines include a set of memory cells which stores a combination of elements of the multiple kernel matrices. For this example, the kernel matrix for FILTER 1, as shown in FIG. 3, can be characterized as a set of vectors of length C (e.g. F1-FC of FIG. 1) of filter having coordinates in the R,S plane, as follows:

| | | |
|---|---|---|
| $F^1_{-1,-1}$ | $F^1_{-1,0}$ | $F^1_{-1,1}$ |
| $F^1_{0,-1}$ | $F^1_{0,0}$ | $F^1_{0,1}$ |
| $F^1_{1,-1}$ | $F^1_{1,0}$ | $F^1_{1,1}$ |

The kernel matrix for FILTER M can be characterized as a set of vectors of length C (e.g. F1-FC of FIG. 1) of filter $F^M$, having coordinates in the R,S plane, as follows:

| | | |
|---|---|---|
| $F^M_{-1,-1}$ | $F^M_{-1,0}$ | $F^M_{-1,1}$ |
| $F^M_{0,-1}$ | $F^M_{0,0}$ | $F^M_{0,1}$ |
| $F^M_{1,-1}$ | $F^M_{1,0}$ | $F^M_{1,1}$ |

Thus, each of the M kernel matrices includes nine vectors. In a convolution of horizontal and vertical stride 1 over an input matrix, each vector of the input matrix can be combined with each of the 9 vectors in each of the M kernels (9*M combinations) for the purposes of computing different values in the output matrix. Some input vectors on the edges for example may be combined with different numbers of the vectors, depending on the particular convolution being computed.

The array of cells in FIG. 5 stores the elements of one vector of the kernel in one column. Thus, for the 3×3 kernels in this example, 9 sets of cells are used to store 9 vectors for each kernel. The cells on second access lines 501 to 509 store the vectors of the first filter $F^1$ as described with reference to corresponding cells of FIG. 3. The cells in the column operatively coupled to second access line 511 form a set of cells that stores elements of a vector $F^M_{-1,-1}$ of an Mth filter $F^M$ at coordinate −1,−1. The cells in the column operatively coupled to second access line 512 form a set of cells that stores elements of a vector $F^M_{-1,0}$ of the Mth first filter $F^M$ at coordinate −1,0. The cells in the column operatively coupled to second access line 513 form a set of cells that stores elements of a vector $F^M_{-1,1}$ of the Mth filter $F^M$ at coordinate −1,1. The cells in the column operatively coupled to second access line 514 form a set of cells that stores elements of a vector $F^M_{0,-1}$ of a first filter FM at coordinate 0,−1. The fifth through eighth columns are not shown in FIG. 3. The last column in the array, including cells operatively coupled to second access line 519, form a set of cells that stores elements of a vector $F^M_{1,1}$ of the Mth filter $F^M$ at coordinate 1,1.

To perform an in-memory computation, driver circuitry applies an input vector X1:XC to the set of first access lines 521-528, in this example, assuming a depth C of 8. Sensing circuitry is coupled to the set of second access lines 501-509 and to the set of second access lines 511-519 to sense, for each of the multiple sets of cells on the different second access lines, a combination of the conductances of the memory cells in their corresponding set of cells.

As mentioned above, the sensed outputs can be provided to digital logic to gather and accumulate the outputs to compute the elements of the output matrix.

In some embodiments, the array of cells can be expanded to store the kernel data for a plurality of convolutions, such as convolutions for multiple layers of a CNN.

Figure 6:
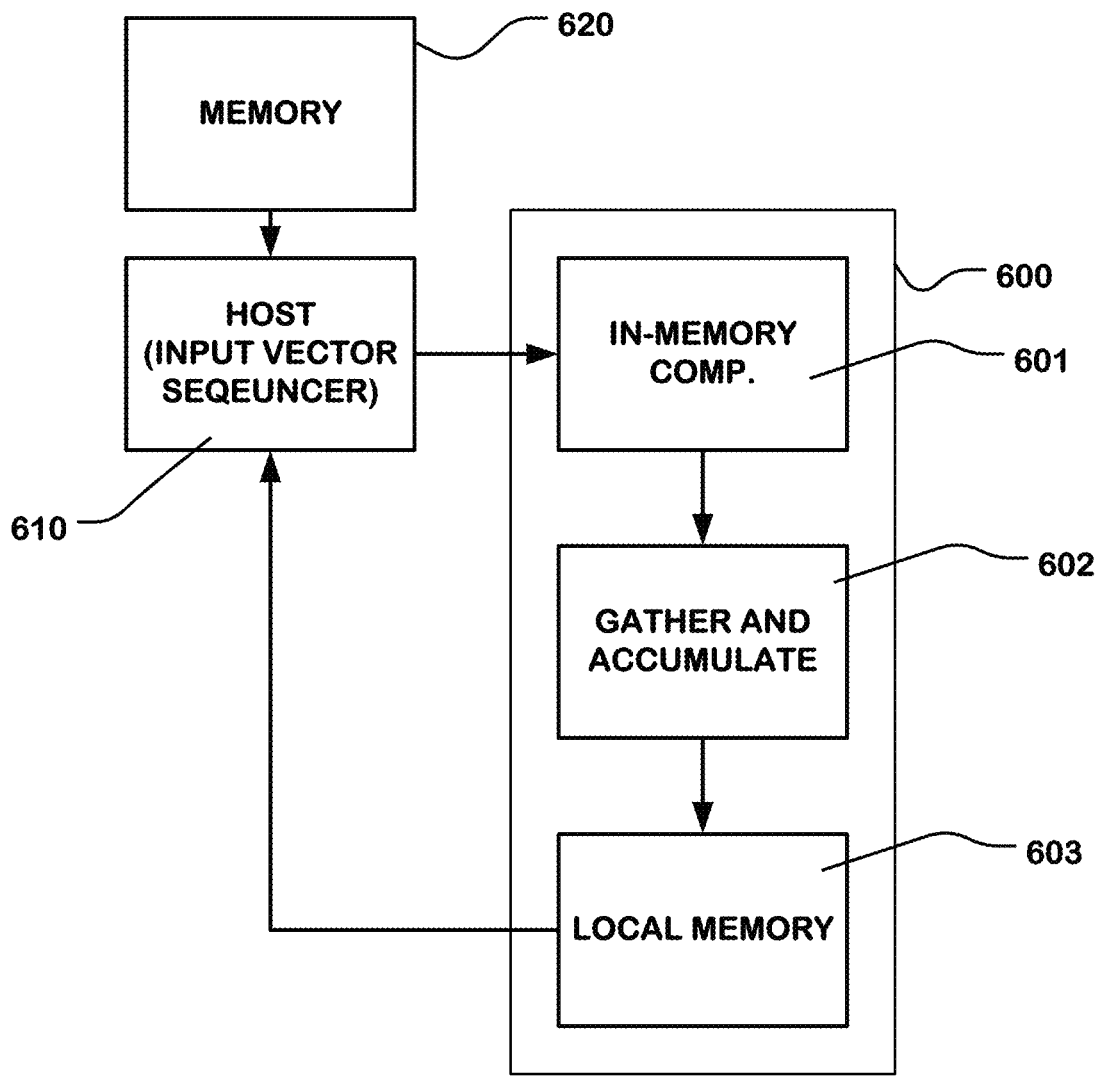
FIG. 6 is a simplified system block diagram for a system for accelerating a convolution.

FIG. 6 illustrates a system incorporating in-memory computation as described herein, suitable for executing a CNN or other data processing operation that utilizes a convolution. The system includes a first integrated circuit 600 including an in-memory computation unit 601 comprising an array of cells configured for in-memory computation, such as described with reference to FIGS. 3-5. The output of the in-memory computation unit is applied to logic 602 which gathers and accumulates, or otherwise manipulates, the data the outputs of the in-memory computation to generate an output matrix. The output matrix is stored in local memory 603 on the first integrated circuit 600. The first integrated circuit 600 in this example is coupled to a host 610, which can be a data processing system configured for machine learning or other system that utilizes complex convolution operations. For example, the host 610 can be an image processor. The host 610 can be coupled to a large-scale memory 620, such as DRAM or other high-speed or high-capacity memory. The host can include computer programs that implement or support logic coupled to the driver circuitry and sensing circuitry via for example addressing and command sequences applied to the computation unit 601 to apply a sequence of input vectors of the input matrix from the DRAM or other source of the input matrix data to the driver circuitry, and in coordination with the sequence of input vectors, and the gather and accumulate logic 602 on the computation unit 601 produce output data representing contributions of input vectors in the sequence, including said input vector, to elements of the output matrix, and to combine the output data for the sequence of input vectors to produce to produce elements of the output matrix.

In this example, the in-memory computation unit 601 which comprises an array of memory cells, is manufactured on the same integrated circuit as the logic circuits (Gather and accumulate unit 602 and local memory 603) used to manipulate the outputs. Host 610 and large-scale memory 620 can be implemented off of the integrated circuit 600.

In some embodiments, all these components can be implemented on a single integrated circuit, or single multi-chip package.

Figure 7:
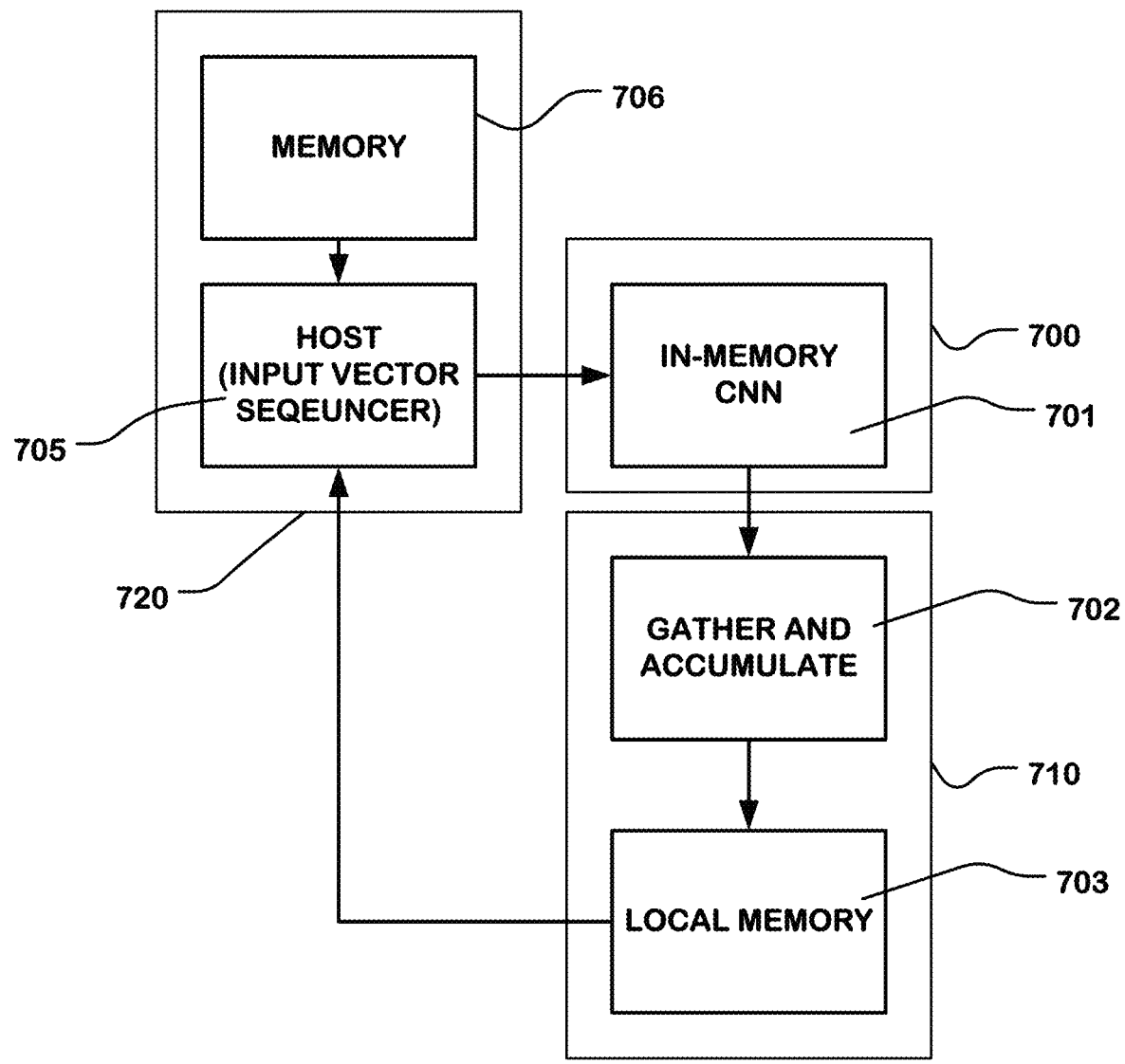
FIG. 7 is a simplified system block diagram for an alternative embodiment of a system for accelerating a convolution.

FIG. 7 illustrates another embodiment of a system incorporating in-memory computation as described herein, suitable for executing a CNN or other data processing operation that utilizes a convolution. This is representative of a variety of configurations in which the logic supporting the convolution operations is arranged in combinations of software on instruction processors, in special purpose logic, in data flow graphs on programmable gate arrays, and otherwise.

In this embodiment, an in-memory computation unit 701 is implemented on a first integrated circuit 700. The first integrated circuit 700 has digital outputs from the sense amplifiers for example applied to a second integrated circuit 710. The second integrated circuit 710 comprises logic circuitry for manipulating the outputs, including the gather and accumulate unit 702 and local memory 703 in this example. Likewise, a host 705 and large-scale memory 706 may be implemented on a third integrated circuit 720. The integrated circuit 710 and 720 can be manufactured using fabrication facilities optimized for implementation of logic circuits. The integrated circuit 700 on the other hand can be manufactured using fabrication facilities optimize for the type of memory array utilized.

Figure 8:
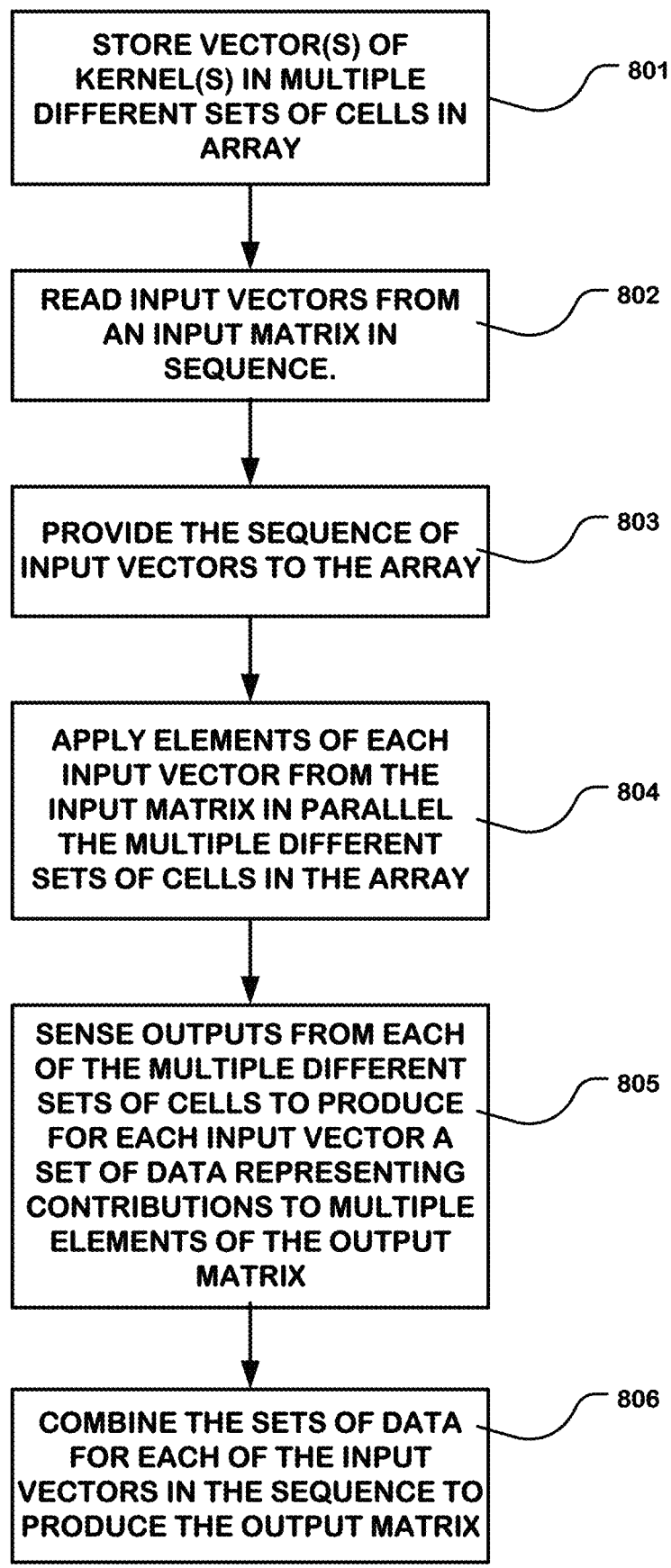
FIG. 8 is a flowchart illustrating a method for accelerating a convolution as described herein.

FIG. 8 is a flowchart showing a method for accelerating a convolution of a kernel matrix over an input matrix in which input vectors from the input matrix are combined with various combinations of elements of the kernel matrix for computation of an output matrix. Different sets of cells in the array can be used to implement the various combinations of elements. In preparation for the computation, the method includes storing the vectors of one or more kernels in different sets of cells in the array, where each of the vectors of the kernels comprises a different combination of elements of a kernel matrix (801). To execute computation, input vectors from an input matrix are read from memory in sequence (802). The sequence of input vectors is provided to the input drivers for the array (803). This results in applying elements of each input vector from the input matrix in parallel to the different sets of cells in the array (804). Next, the outputs from each of the different sets of cells is sensed to produce for each input vector a set of data representing contributions to multiple elements of the output matrix (805). Finally, the sets of data for each of the input vectors in the sequence are combined to produce the output matrix (806).

Using this process, an input matrix can be applied only once to the in-memory computation unit. This can eliminate the requirement to repeatedly read and write vectors from the input matrix for the purposes of computation of different strides of the convolution. As result, the system can operate with lower cost, and lower bandwidth data paths for movement of the input matrix and output matrix among the computational resources.

In embodiments in which the convolutions are implemented as layers of a CNN, for example, this cycle can be repeated using a single in-memory computation unit in which multiple kernels or sets of kernels are arranged in a large-scale array of cells, for the multiple layers of the CNN. Once an output vector is computed as a result of a first layer of the CNN, the algorithm can loop to providing the input matrix to another layer of the CNN. Alternatively, the output matrix produced as a result of the in-memory computation unit can be configured as an input matrix for a next layer of the CNN.

As a result of utilizing the in-memory computation configured as described herein, a system for executing convolutions is provided that can significantly reduce the amount of data movement required. This can increase the speed of operation, reduce the power required to execute the operation, and decrease the bandwidth requirement for movement of data during the convolution.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for accelerating a convolution of a kernel matrix over an input matrix, comprising:
   storing combinations of elements of the kernel matrix in respective sets of cells in an array of cells; and
   applying elements of an input vector from the input matrix to the sets of cells storing the combinations of elements of the kernel matrix;

sensing outputs responsive to the elements of the input vector from the sets of cells to produce data representing contributions of the input vector to multiple elements of an output matrix;

applying input vectors from the input matrix in a sequence, including said first mentioned input vector, to the sets of cells storing the combinations of elements of the kernel matrix;

for each input vector in the sequence, sensing outputs from the sets of cells to produce output data representing contributions to the output matrix; and combining the output data representing contributions to the output matrix for each of the input vectors in the sequence to produce the output matrix.

2. The method of claim 1, wherein the sets of cells are disposed in an array of cells including a plurality of columns of cells, and wherein each set of cells is composed of cells in a single column in the plurality of columns.

3. The method of claim 1, wherein the sets of cells comprise programmable resistance memory cells.

4. The method of claim 1, wherein the sets of cells comprise charge trapping memory cells.

5. The method of claim 1, wherein said sensing includes sensing a combined conductance of cells in each of the sets of cells in response to the input vector.

6. The method of claim 1, wherein said outputs represent, for each of the sets of cells, respective sums of products of the elements of the input vector and corresponding combinations of elements of the kernel matrix.

7. The method of claim 1, including providing the output data to digital logic, and combining the output data in the digital logic for each of the input vectors in the sequence to produce the output matrix.

8. The method of claim 1, wherein said convolution of a kernel matrix over an input matrix is a layer of a convolutional neural network.

9. A device for convolution of a kernel matrix over an input matrix, comprising:

an array of memory cells storing combinations of elements of the kernel matrix in respective sets of cells in the array of cells;

driver circuitry configured to apply elements of an input vector from the input matrix to the respective sets of cells; and sensing circuitry configured to sense output data from the respective sets of cells to produce data representing contributions of the input vector to multiple elements of an output matrix, wherein said output data represents, for the respective sets of cells, a sum of products of the elements of the input vector and the combinations of elements of the kernel matrix stored in the respective sets.

10. The device of claim 9, including logic coupled to the driver circuitry to apply a sequence of input vectors of the input matrix, including said first mentioned input vector, to the driver circuitry, and logic coupled to the sensing circuitry to combine the output data for the sequence of input vectors to produce elements of the output matrix.

11. The device of claim 9, wherein the array of memory cells comprises a plurality of columns, a set of cells of the respective sets of cells is composed of cells in a single column in the plurality of columns.

12. The device of claim 9, wherein the array of cells comprises programmable resistance memory cells.

13. The device of claim 9, wherein the array of cells comprises charge trapping memory cells.

14. The device of claim 9, wherein said sensing circuitry senses a combined conductance of cells in the respective sets of cells in response to the input vector.

15. The device of claim 9, wherein the array of memory cells is disposed on a first integrated circuit, and including logic disposed on circuitry outside the first integrated circuit to apply a sequence of input vectors of an input matrix to the driver circuitry, and to combine the sets of data for each of the input vectors in the sequence to produce the output matrix.

16. The device of claim 9, wherein said convolution of a kernel matrix over an input matrix is a layer of a convolutional neural network.

17. A device for convolution of a kernel matrix over an input matrix, comprising:

an array of memory cells including a plurality of rows and a plurality of columns, storing combinations of elements of the kernel matrix in respective columns in the plurality of columns;

driver circuitry configured to apply elements of an input vector from the input matrix to respective rows in the plurality of rows;

sensing circuitry configured to sense output data from the respective columns to produce data representing contributions of said input vector to elements of an output matrix;

logic coupled to the driver circuitry and the sensing circuitry to apply a sequence of input vectors of the input matrix, including said input vector, to the driver circuitry and produce output data representing contributions of input vectors in the sequence, including said input vector, to elements of the output matrix; and logic coupled to the sensing circuitry to combine the output data for the sequence of input vectors to produce elements of the output matrix, wherein said output data represents, for the respective columns, a sum of products of the elements of said input vector on the respective rows and the combinations of elements of the kernel matrix stored in the respective columns.

* * * * *